United States Patent [19]  
Perrain

[11] 4,109,423  
[45] Aug. 29, 1978

[54] FIRE-PROOF DEVICE FOR A TUBE OF FUSIBLE MATERIAL WHICH EXTENDS THROUGH A WALL

[75] Inventor: Maurice Eugéne Perrain, Nancy, France

[73] Assignee: Pont-a-Mousson S.A., Nancy, France

[21] Appl. No.: 784,756

[22] Filed: Apr. 5, 1977

[30] Foreign Application Priority Data

Apr. 14, 1976 [FR] France .................. 76 10998

[51] Int. Cl.² ............... E04H 9/00; F16K 13/00
[52] U.S. Cl. .................................. 52/1; 49/1; 52/232; 137/77; 137/360; 251/7
[58] Field of Search ............. 49/1; 137/77, 360; 52/1, 232; 169/56; 251/7

[56] References Cited

U.S. PATENT DOCUMENTS

| | | | |
|---|---|---|---|
| 3,255,559 | 6/1966 | Gaeth et al. | 52/232 |
| 3,426,491 | 2/1969 | Gaeth et al. | 52/232 X |
| 3,462,890 | 8/1969 | Blumenkranz et al. | 52/1 |
| 3,678,634 | 7/1972 | Wise et al. | 52/232 X |
| 3,964,214 | 6/1976 | Wendt | 52/232 X |

FOREIGN PATENT DOCUMENTS 2,162,251  6/1973  Fed. Rep. of Germany ............ 52/232

Primary Examiner—Alfred C. Perham  
Attorney, Agent, or Firm—Sughrue, Rothwell, Mion, Zinn and Macpeak

[57] ABSTRACT

The device comprises a case of a material non-deformable under the effect of heat and mounted on the wall around at least a part of the tube. A mass of material capable of swelling under the effect of heat is enclosed in the case. An element of a material which is substantially non-fusible at temperatures which are developed in the course of a fire has a part which is planar and perpendicular to a radial direction relative to the tube and is movable and slidable in said radial direction in the case. The element normally bears on the outer surface of the tube and the mass of swelling material is disposed on the opposite side of the element to the tube.

9 Claims, 6 Drawing Figures

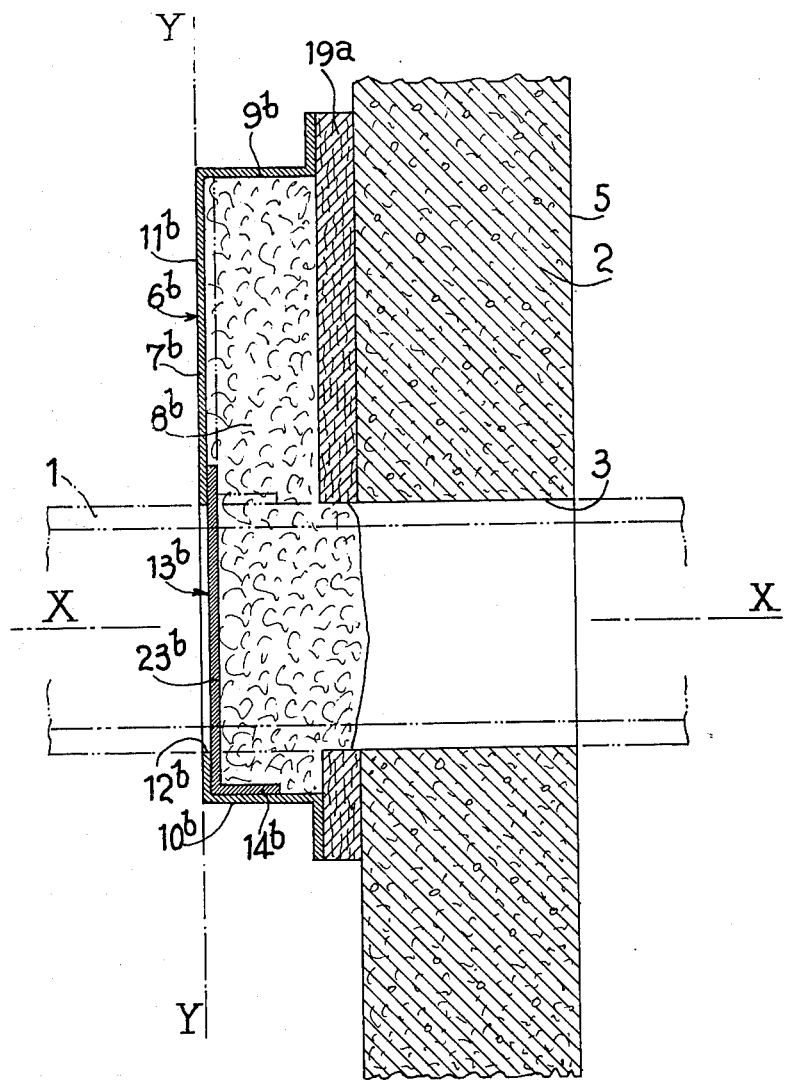

FIRE-PROOF DEVICE FOR A TUBE OF FUSIBLE MATERIAL WHICH EXTENDS THROUGH A WALL

The present invention relates to fire-proof devices equipping tubes of fusible material, such as plastics material, which extend through walls such as supporting walls, partition walls, floors, flagstones, slabs and other walls of a building and more particularly to devices of the type comprising a case which is of a material substantially undeformable under the effect of heat and is mounted on said wall around at least a part of the tube and encloses a mass of swelling material, for example foam material which swells under the action of heat. The fire-proof walls whose fire-proof character is to be maintained notwithstanding the passage of tubes of fusible material, of course themselves satisfy present regulations concerning the prevention of fire and fire fighting.

With these devices, in the event of fire on one side of the wall, if the tube melts and even completely burns, the opening it leaves in the wall and through which the smoke and flames are liable to pass to the other side of the wall, is automatically and rapidly obturated by the material which has swollen until it occupies the whole of the volume of the opening.

An object of the invention is to improve the properties of permanence and resistance of the obturation thus obtained and for this purpose it provides a device of the aforementioned type, wherein there is further provided an element of a material which is substantially non-fusible at service temperatures, that is to say the temperatures which are developed in the course of a fire, and has a part which is substantially planar and perpendicular to a radial direction relative to the tube and is mounted to be movable and slidable in said direction in the case, said element normally bearing on the outer surface of the tube and the mass of swelling material being disposed in the case on the opposite side of said element to the tube.

Thus, when the tube melts or burns, this element slides in the case under the effect of the expansion of the swelling material so that it renders this expansion both well oriented in the radial direction of sliding and well uniform in a surface which is substantially perpendicular to said direction, which perfectly distributes the corresponding force on the tube in process of melting or burning.

The rigidity of the material from which this slidable element is made, although it must be sufficient, even at the service temperatures, to ensure the indicated function of distribution and radial guiding of the expansion force, must not be such that this element is capable of breaking under the effect of this expanding action on the tube which is not yet completely deteriorated. It may therefore be for example a deformable metal whose mechanical behaviour, and therefore modulus of elasticity, drops rapidly in a range of temperatures higher than 500° C., but this metal, while it is deformable, must not be fusible at the high service temperatures, since otherwise it would be liable to communicate the fire to the opposite side of the wall. It may therefore be advantageously of a metal, such as for example steel, which only melts at around 1,300° C.

The case must of course extend in a direction perpendicular to the axis of the tube over at least the entire section of this tube, so that when the material swells, it is guided throughout this section, but it may either comprise two masses of swelling material disposed on each side of the tube with the interposition between these masses and the tube of two slidable elements, or comprise a single mass which is disposed on one side of the tube and maintained by a single slidable element. In this case, the case must extend to the plane of symmetry with respect to the axis of the tube of the plane containing the slidable element and be closed in this plane by a face which is tangent to the tube. This arrangement having a single slidable element may be necessary in the case of a tube which is inaccessible from one side, for example which extends through a wall in the vicinity of the intersection of the wall with one or two other walls which are perpendicular thereto.

The case is closed in an advantageous manner on the tube and the wall so as to constitute with the latter a closed volume in presenting contours which are applied, on one hand, on the tube and, on the other hand, on the wall. It has advantageously a generally rectangular-sided shape limited of course to said contours which are applied on the wall and the tube, the slidable element being in this case rectangular.

It may be mounted partly embedded in the wall or applied against the surface of the wall, which permits employing the device without preparation of this wall. In both cases, a second device may be provided on the opposite side of the wall. The device may moreover pass fully through the wall, in which case it has two faces perpendicular to the axis of the tube.

On the other hand, in the first two cases, the face of the case confronting the wall, or embedded in the latter, is either absent or constituted by a material which is non conductive of heat or refractory, so as to avoid the risk of the transmission of the fire from the other side of the wall. Likewise, in the case of a device extending through the wall, the surface of the case, serving as an envelope in the radial direction, is for the same reason, either interrupted or constituted by a material which is non-conductive of heat in its central part, and it is in this case preferable to replace the swelling material in the central part by an insulating and possibly refractory filling.

Furthermore, in the case of a case applied against the wall or in which the face of the case facing the wall is constituted by a material non-conductive of heat, this material is preferably a sufficiently rigid material, such as for example asbestos-cement so as to maintain the shape of the case, even if the case is detached from the wall when the latter cracks under the effect of the fire.

In a particularly advantageous manner, the slidable element has a second part integral with the first part which is disposed between the mass of swelling material and the face of the case opposed to the wall and which therefore can move in sliding also in the case on said face so as to close the circular orifice which remains free in the region of this face as soon as the tube has melted or burnt. This part of the slidable element therefore completes the face of the case and forms a screen maintaining in the same region the front offered to the fire, whereas in the absence thereof, the swelling material beyond a certain temperature, for example 1,000° C., loses its water of constitution and becomes vitrified and flows so that the front offered to the fire withdraws as its degradation progresses.

The mass of swelling material is constituted for example by aqueous sodium silicate and its volume, and therefore the dimensions of the case and the slidable elements, are so calculated that the expansion of the corresponding mass occupies the entire volume offered thereto. The thickness of the mass determines the obturating time and a sufficient length of the case ensures in all cases a sufficient duration of the obturation bearing in mind a possible decomposition of the foam in contact with the fire. This material may furthermore be foliated, that is to say be in the form of a plurality of layers separated by sheets of a heat conductive material which accelerates the transmission of the heat through the mass of swelling material and therefore the expansion of the latter, this material also being deformable at the high service temperatures so as to avoid hindering this expansion, but non-fusible so as to avoid communicating the fire to the opposite side of the wall. It may be for example thin aluminium foil, for example having a thickness of less than 1 mm, whereas the layers of swelling material have a thickness exceeding 1 mm.

Further features and advantages of the invention will be apparent from the ensuing description given by way of a non-limitative example with reference to the accompanying drawings in which:

FIG. 6 is a view of a modification of the embodiment of the invention shown in FIGS. 4 and 5, after operation in the course of a fire.

In the two illustrated embodiments, the device is adapted to equip a cylindrical tube having an axis X—X and composed of a fusible material, such as a plastics material such as polyethylene, this tube extending through a wall, such as a wall 2, through a circular passage 3 therein corresponding to the outside diameter of this tube. This wall has the regulation fire-proof structure and it has two opposed planar faces 4 and 5.

Figure 3:
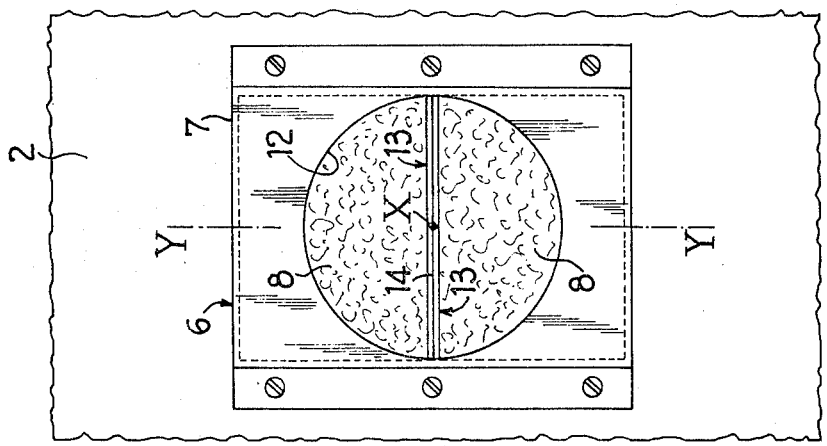
FIG. 3 is a view similar to FIG. 2, after operation of the device in the course of a fire.
Figure 4:
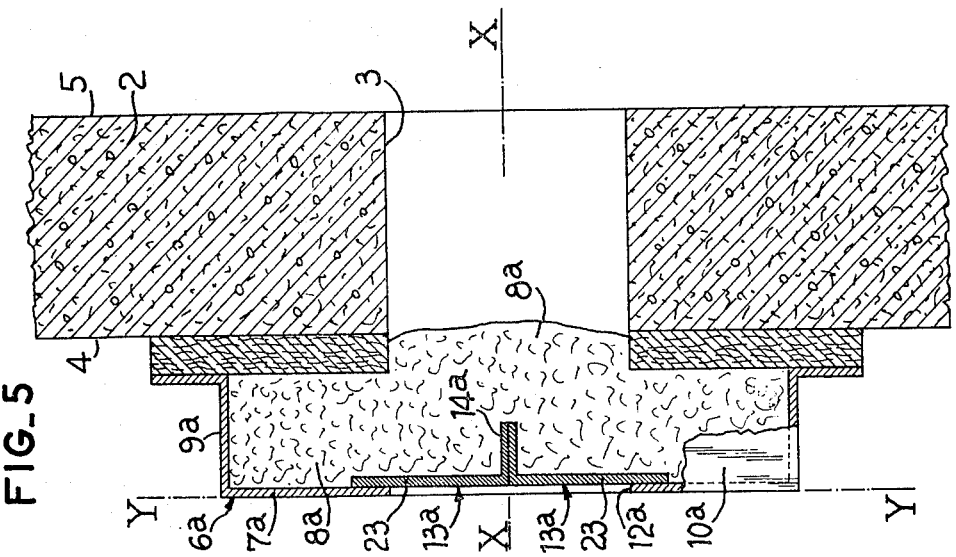
FIG. 4 is a view similar to FIG. 1, in respect of a device according to a second embodiment of the invention.
Figure 5:
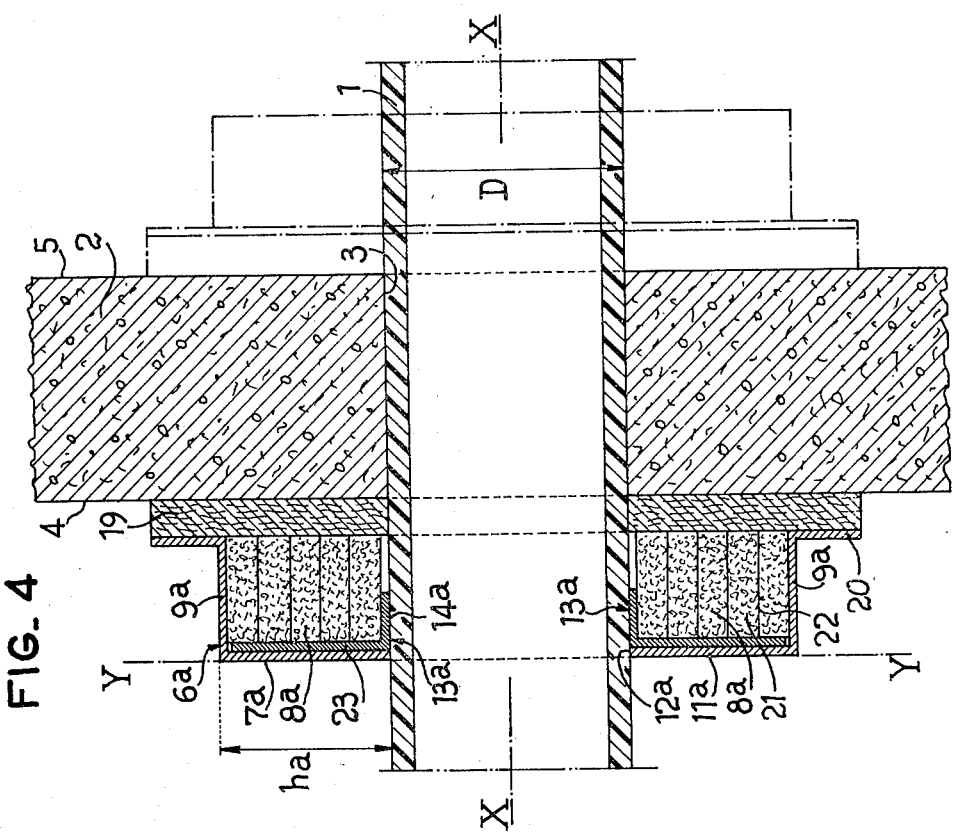
FIG. 5 is a view of the device shown in FIG. 4 after operation in the course of a fire.

The device 6, in respect of the embodiment shown in FIGS. 1 to 3, and 6a and in respect of the embodiment shown in FIGS. 4 and 5, comprises a case 7 or 7a of a material which is substantially non-deformable under the effect of heat and constituted by sheet steel, this case being mounted on the face 4 of the wall 2 around the tube 1. This case 7 or 7a encloses a mass 8 or 8a of a material which swells or inflates under the effect of heat, constituted by aqueous sodium silicate.

Figure 2:
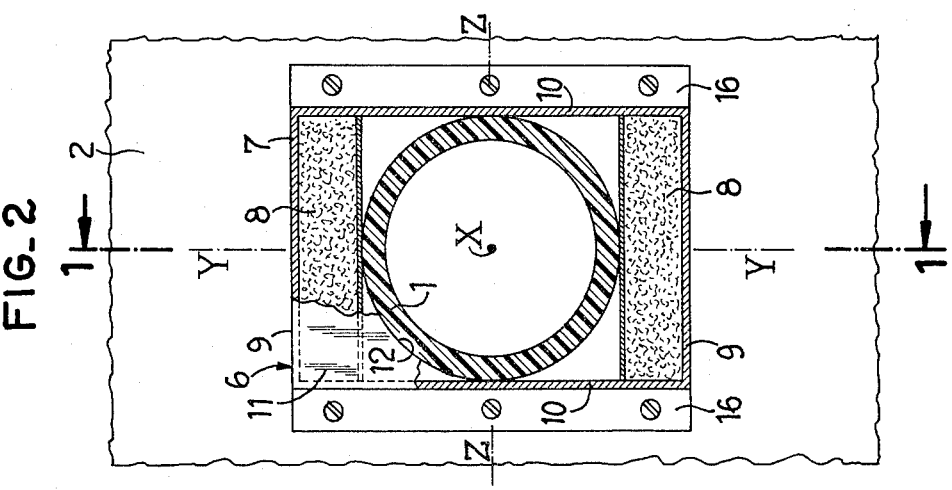
FIG. 2 is a sectional and en elevational view, with parts cut away, of the device shown in FIG. 1, the section being taken on line 2—2 of FIG. 1.

In both embodiments, the case 7 or 7a has a generally rectangular-sided shape with two larger dimensions in two directions Y—Y and Z—Z parallel to the wall 2 and a relatively smaller dimension in a direction perpendicular to this wall, that is to say parallel to the axis X—X. Its dimension along the axis Y—Y is larger than the diameter D of the tube 1 and exceeds the latter by a value $h$, whereas in the direction Z—Z, its dimension may be equal to this diameter D as shown in FIGS. 2 and 3 but may also be greater than the latter. The steel case 7 or 7a has four small side walls 9 or 9a, and 10 and 10a, respectively perpendicular to the axes Y—Y and Z—Z and a large front wall 11 or 11a located on the side of the cased opposed to the wall 2, this front wall 11 or 11a having a circular central orifice 12 or 12a whose diameter equals the outside diameter of the tube 1 which extends therethrough.

In the two embodiments, the device further comprises two elements 13 or 13a of a material which is substantially non-fusible at the service temperatures and constituted by steel, each of these elements having a part 14 or 14a which is planar and rectangular and disposed to be perpendicular to the direction Y—Y. These parts 14 or 14a are mounted to be movable and slidable in the case in the direction Y—Y, and in the normal position, that is to say in the absence of fire, these parts 14 or 14a bear on the tube 1 in a tangential manner thereto above and below the tube in the direction Y—Y. In this position, these members 14 or 14a define with the sides 9 or 9a and a part of the side walls 10 or 10a of the case, volumes which have a thickness $h$ in the direction Y—Y and are filled with the mass of swelling material 8 which is thus divided into two blocks disposed respectively above and below the tube.

Figure 1:
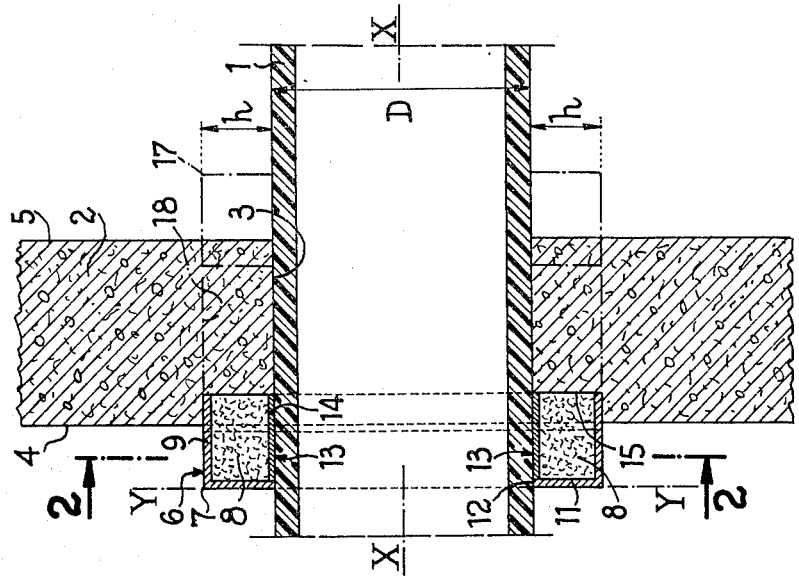
FIG. 1 is a diametral sectional view taken on line 1—1 of FIG. 2 of a device according to a first embodiment of the invention.

In a first embodiment, shown in FIGS. 1 to 3, in which the dimension $h$ of each of the blocks of swelling material 8 is of the order of magnitude of one quarter of the diameter D of the tube, whereas its thickness in the direction perpendicular to the wall 2 is slightly greater than this dimension $h$. The case is partly embedded, for example on one third of its thickness, in the wall 2 which as for this purpose a corresponding recess 15 corresponding for example to one fifth of its thickness. The side walls 9 and 10 of the case bear partially on the lateral wall of this recess whereas, on the other hand, the case has no side facing the end of the recess, the blocks of swelling material 8 thus bearing directly against the wall. In this embodiment, the elements 13 are solely constituted by the planar members 14 whose dimensions are identical to those of the side wall 9 so that these elements are slidable in the case in the direction Y—Y. Although it is embedded, the case 7 is fixed to the face 4 of the wall 2 by two flanges 16 which are integral with its side wall and fixed to the wall by screws.

The device just described operates in the following manner:

In the event of a fire breaking out on the side corresponding to the face 4 of the wall, the metal case 7 transmits heat to the material constituting the blocks 8 and the latter, whose possibilities of expansion are precluded, on one hand, in the outward radial direction by the structure of the swelling material, radially swells in the direction Y—Y, the elements 13 urging back in the manner of pistons the pipe 1 of plastics material, which, under the action of the heat, softens and is possibly decomposed and even, in the extreme case, entirely burnt. These elements 13 thus distribute the force of the pressure due to the swelling of the blocks 8 while preferentially orienting this action in the direction Y—Y. The possiblity of deformation of the steel of the elements 13 enables them to adapt themselves to the shape of the tube 1 in the course of its own deformation with no risk of these elements breaking.

FIG. 3 shows the device in the case where the tube 1 has completely burnt, the two elements then being in contact with each other with a complete filling of the case, between the walls of the latter and the elements 13, by the expanded masses of the blocks 8. This consequently provides a complete and perfect obturation of the section of the orifice 3 of the wall which otherwise would present a risk of passage of smoke or flames through the wall.

FIG. 1 again illustrates, in dot-dash lines, the possibility of disposing a second symmetrical device 17 on the opposite face 5 of the wall. It also shows the possibility of providing a device which extends fully through the wall and which would be constituted by the union of the two devices 6 and 17 with an intermediate part 18 which however may not have a metal wall so as to avoid transmitting heat from one side of the wall to the other, the inner volume of this intermediate part being moreover filled for example with an insulating and refractory material which does not swell.

The device of the embodiment shown in FIGS. 4 and 5 is similar to that shown in FIGS. 1 to 3 as concerns the parts thereof already described. However, instead of being embedded in the wall, the device is fixed on the wall 2 by applying it against the planar face 4 of the wall with interposition of a sheet of asbestos-cement 19 which is rather thick and also has a central orifice for the passage of the tube 1 and extends beyond the case 7a in the direction Y—Y to a certain extent so as to permit the fixing of folded tabs 20 of the case. The two blocks 8a of swelling material have a foliated structure by the interposition of metal sheets the rather thick layers of swelling material 21, for example aluminium foil 22, which are rather deformable owing to a thickness of for example less than 1 mm, these sheets being moreover disposed perpendicular to the direction Y—Y. The elements 13a each have a second part 23 which acts as a shutter and is planar and perpendicular to the axis X—X and disposed between each of the blocks 8a and the large side 11a of the case. These parts 23 are rectangular and extend to the sides 9a of the case. The parts 14a of the elements 13a moreover extend axially to the extent of only one half of the thickness of the case. This thickness is moreover less than the dimension ha of the case which is itself slightly less than the diameter D of the tube.

This device operates in a manner similar to that of the device shown in FIGS. 1 to 3, but it has the further advantage that the shutter parts 23 of the elements 13a promote the guiding of the masses of material 8a in the course of expansion and also a complete obturation of the orifice 12a of the case at the end of the expansion. Moreover, the fact that the parts 14a of the slidable elements extend only on one half of the thickness of the case enable the two masses 8a to meet each other and melt, at the end of the expansion, in the region of the axis X—X. The asbestos-cement plate 19 not only protects the face 4 of the wall from the heat, it also serves as a support for the case should the face 4 of the wall crack under the effect of the heat.

FIG. 6 shows a modification of the embodiment of the invention shown in FIGS. 4 and 5. This device 6b is basically similar in construction to the device 6a except that a single slidable element 13b is employed instead of the two elements 13a of the device 6a. Further, a single mass 8b of a material which swells or inflates under the effect of heat, for example constituted by aqueous sodium silicate, is employed instead of the two masses 8a of the device 6a. The case 7b has been modified in consequence to accomodate the larger single mass of material 8b which is disposed on only one side of the pipe 1 (shown in dot-dash line in FIG. 6). The asbestos-cement sheet 19a has also been modified for the same reason. The position of the part 14b of the slidable element 13b is shown in dot-dash line in its position before the swelling of the mass 8b, in which it bears against the top side of the pipe 1. The swelling of the mass 8b causes the sliding element 13b to reach the lower position shown in full line in FIG. 6 in which the part 14b bears against the lower wall 9b of the case 7b. The circular orifice 12b provided in this case for the passage of the pipe 1 is now closed by the shutter part 23b of the element 13b. As can be seen in FIG. 6, the mass of material 8b also closes the passage 3 in the wall 2.

Having now described my invention what I claim as new and desire to secure by Letters Patent is:

1. In a fire-proof device for a tube of fusible material extending through an aperture in a wall of a structure, comprising, in combination with said wall, means defining a case of a material which is substantially nondeformable under the effect of heat and mounted on said wall around the aperture, and means within the case for radially crushing the tube and closing off said aperture when the tube softens under the effect of a fire; the improvement wherein said tube crushing and aperture closing means comprise a mass of a material which is capable of swelling under the effect of heat and is enclosed within the case, the case comprising a front wall, a rear wall substantially parallel to the front wall, two substantially parallel first side walls interconnected by the front wall, and two second side walls interconnected by the front wall, the front wall defining an orifice substantially coaxial with said aperture and through which orifice the tube extends in use of the device, a shutter element movable between an inoperative position in which said orifice is fully open and a passage is allowed for the tube and an operative position in which said orifice and the tube are completely closed by the shutter element, the shutter element being of a material which is substantially non-fusible at service temperatures, that is to say the temperatures which are developed in the course of a fire and having a first part which is substantially planar and substantially perpendicular to a radial direction relative to the axis of the orifice and aperture and is mounted to be movable in said radial direction in the case substantially in contact with said front wall and second side walls and a second part which lies alongside and is in contact with said front wall and has an extent in said radial direction and an extent in a direction perpendicular to said radial direction which enable said second part to completely close said orifice in said operative position of the shutter element, and the mass of swelling material being disposed in and filling that part of the case located on the opposite side of said first part to the tube and located on the opposite side of said second part to said front wall, the swelling material being capable of swelling in said radial direction sufficiently to shift said shutter element to said operative position of the shutter element.

2. A device as claimed in claim 1, wherein the second part of the shutter element is slidable between said first side walls.

3. A device as claimed in claim 1, wherein a side of the case opposed to said front wall is constituted by a material which is non-conductive of heat and in adjoining relation to said wall of a structure.

4. A device as claimed in claim 3, wherein said side of the case adjoining the wall of a structure is of a rigid material.

5. A device as claimed in claim 1, wherein the case is partly embedded in the wall of a structure.

6. A device as claimed in claim 1, wherein the case has a rectangular-sided shape and has contours for bearing against the tube and against the wall of a structure and the first part and second part of the shutter element are rectangular.

7. A device as claimed in claim 1, wherein the mass of swelling material is foliated and sheets of a heat-conductive material which is deformable and substantially non-fusible are interposed between the foliated material, said sheets being oriented in a direction perpendicular to said radial direction and in contact with said second part of the shutter element.

8. A device as claimed in claim 1, wherein said first part extends from said second part to an extent less than the thickness of said mass of material in a direction parallel to the axis of the orifice and aperture whereby a part of the mass of material is enabled to swell directly into said aperture in the event of fire.

9. In a fire-proof device for a tube of fusible material extending through an aperture in a wall of a structure comprising, in combination with said wall, means defining a case of a material which is substantially non-deformable under the effect of heat and mounted on said wall around the aperture, and means within the case for radially crushing the tube and closing off said aperture when the tube softens under the effect of a fire; the improvement wherein said tube crushing and aperture closing means comprise two masses of a material which is capable of swelling under the effect of heat and are enclosed within the case, the case comprising a front wall, a rear wall substantially parallel to the front wall, two substantially parallel first side walls interconnected by the front wall, and two second side walls interconnected by the front wall, the front wall defining an orifice substantially coaxial with said aperture and through which orifice the tube extends in use of the device, two shutter elements respectively combined with said two masses and relatively movable between inoperative withdrawn positions in which said orifice is fully open and a passage is allowed for the tube and operative positions in which the two shutter elements are in contact with each other and said orifice and the tube are completely closed by the two shutter elements, the shutter elements being of a material which is substantially nonfusible at service temperatures, that is to say the temperatures which are developed in the course of a fire, each shutter element having a first part which is substantially planar and substantially perpendicular to a radial direction relative to the axis of the orifice and aperture and is mounted to be movable and slidable in said radial direction in the case substantially in contact with said front wall and second side walls and a second part which lies alongside and is in contact with said front wall, said second parts having an extent in said radial direction and an extent in a direction perpendicular to said radial direction which enable said second parts to together completely close said orifice in said operative positions of the shutter elements, and said masses of swelling material being respectively disposed in and filling two opposed parts of the case located on the opposite side of said first parts to the tube and located on the opposite side of said second parts to said front wall, the swelling material of said masses being capable of swelling in said radial direction sufficiently to shift said shutter elements to said operative positions of the shutter elements.

* * * * *